US009284130B1

(12) United States Patent
Himmelmann

(10) Patent No.: US 9,284,130 B1
(45) Date of Patent: Mar. 15, 2016

(54) MULTI-ZONE LOAD LEVELING SYSTEM FOR AIR CUSHION SUPPORTED AIRCRAFT CARGO LOADING ROBOT

(71) Applicant: GOODRICH CORPORATION, Charlotte, NC (US)

(72) Inventor: Richard A. Himmelmann, Beloit, WI (US)

(73) Assignee: GOODRICH CORPORATION, Charlotte, NC (US)

( * ) Notice: Subject to any disclaimer, the term of this patent is extended or adjusted under 35 U.S.C. 154(b) by 19 days.

(21) Appl. No.: 14/511,553

(22) Filed: Oct. 10, 2014

(51) Int. Cl.
*G06F 7/00* (2006.01)
*B65G 43/00* (2006.01)
*B64D 9/00* (2006.01)

(52) U.S. Cl.
CPC *B65G 43/00* (2013.01); *B64D 9/00* (2013.01); *B64D 2009/006* (2013.01)

(58) Field of Classification Search
None
See application file for complete search history.

(56) References Cited

U.S. PATENT DOCUMENTS

| | | |
|---|---|---|
| 3,756,544 A | 9/1973 | Bader |
| 3,773,391 A | 11/1973 | Crandall et al. |
| 3,809,268 A | 5/1974 | Lutz |
| 4,131,320 A | 12/1978 | Volat et al. |
| 4,353,457 A | 10/1982 | Haley |
| 4,354,796 A | 10/1982 | Bergman |
| 4,600,169 A | 7/1986 | Koster et al. |
| 4,618,292 A | 10/1986 | Judge et al. |
| 4,676,699 A | 6/1987 | Leonov |
| 5,137,367 A | 8/1992 | Madonia et al. |
| 5,207,115 A | 5/1993 | Takei |
| 5,350,270 A | 9/1994 | Stallard et al. |
| 5,634,636 A | 6/1997 | Jackson et al. |
| 5,690,567 A | 11/1997 | DeNijs et al. |
| 5,850,906 A | 12/1998 | Dean |
| 6,196,788 B1 | 3/2001 | Talbot et al. |
| 6,427,947 B1 | 8/2002 | Rohrlick et al. |
| 6,517,028 B2 | 2/2003 | Huber |
| 6,630,633 B1 | 10/2003 | Uber et al. |
| 7,073,994 B2 | 7/2006 | Huber et al. |
| 7,108,474 B2 | 9/2006 | Moriya et al. |
| 7,393,159 B2 | 7/2008 | Chang et al. |
| 7,494,004 B2 | 2/2009 | Stolyar et al. |
| 7,513,716 B2 | 4/2009 | Hayashi et al. |
| 7,695,235 B1 | 4/2010 | Rallis |
| 7,785,056 B2 * | 8/2010 | Sanford ............... B64D 9/00 414/392 |
| 7,800,009 B2 | 9/2010 | Gochar, Jr. |

(Continued)

OTHER PUBLICATIONS

Notice of Allowance dated Oct. 19, 2015 in U.S. Appl. No. 14/512,000.

(Continued)

*Primary Examiner* — Yolanda Cumbess

(57) ABSTRACT

A cargo shuttle has a first portion and a second portion. The cargo shuttle has a first air blower coupled to the cargo shuttle and is configured to blow air under the first portion at a first rate. The cargo shuttle has a second air blower coupled to the cargo shuttle and is configured to blow air under the second portion at a second rate. The cargo shuttle includes a first proximity sensor coupled to the cargo shuttle that is configured to detect a first distance from the first portion to a floor panel. The cargo shuttle includes a second proximity sensor coupled to the cargo shuttle that is configured to detect a second distance from the second portion to the floor panel. The cargo shuttle includes a processor that is configured to adjust the first rate and the second rate based on the first and second distances.

15 Claims, 8 Drawing Sheets

(56) References Cited

U.S. PATENT DOCUMENTS

| | | | |
|---|---|---|---|
| 8,162,571 | B2 | 4/2012 | Wada et al. |
| 8,602,204 | B2 | 12/2013 | Yang et al. |
| 9,205,923 | B1 | 12/2015 | Himmelmann |
| 2004/0241267 | A1 | 12/2004 | Schultz |
| 2008/0011119 | A1 | 1/2008 | Bartosch |
| 2008/0257692 | A1 | 10/2008 | Wallace |
| 2011/0215198 | A1* | 9/2011 | Panzram .................. B64C 1/20 244/118.1 |
| 2015/0225082 | A1* | 8/2015 | Levron .................... B64D 9/00 244/137.1 |

OTHER PUBLICATIONS

Pre-Interview First Office Action dated Sep. 4, 2015 in U.S. Appl. No. 14/512,000.
Notice of Allowance dated Nov. 13, 2015 in U.S. Appl. No. 14/464,323.
Office Action dated Nov. 17, 2015 in U.S. Appl. No. 14/511,559.
Corrected Notice of Allowability Jan. 7, 2016 in U.S. Appl. No. 14/464,323.
Preinterview First Office Action dated Jan. 7, 2016 in U.S. Appl. No. 14/512,113.

* cited by examiner

MULTI-ZONE LOAD LEVELING SYSTEM FOR AIR CUSHION SUPPORTED AIRCRAFT CARGO LOADING ROBOT

FIELD

The present disclosure relates generally to cargo management systems.

BACKGROUND

Conventional aircraft cargo systems typically include various tracks and rollers that span the length of an aircraft. Power drive units ("PDUs") convey cargo forward and aft along the aircraft on conveyance rollers which are attached to the aircraft floor structure. Cargo may be loaded from an aft position on an aircraft and conducted by the cargo system to a forward position and/or, depending upon aircraft configuration, cargo may be loaded from a forward position on an aircraft and conducted by the cargo system to an aft position. Conventional systems are typically designed to accommodate a particular pallet size. Conventional systems are typically comprised of numerous components that may be time consuming to install, replace and maintain.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

A cargo shuttle is described having a first portion and a second portion. The cargo shuttle also has a first air blower coupled to the cargo shuttle and configured to blow air under the first portion at a first rate. The cargo shuttle also has a second air blower coupled to the cargo shuttle and configured to blow air under the second portion at a second rate. The cargo shuttle also includes a first proximity sensor coupled to the cargo shuttle, the first proximity sensor is configured to detect a first distance from the first portion to a floor panel. The cargo shuttle also includes a second proximity sensor coupled to the cargo shuttle, the second proximity sensor is configured to detect a second distance from the second portion to the floor panel. The cargo shuttle also includes a processor that is configured to adjust the first rate and the second rate based on the first distance and the second distance.

Also described is a method for causing a cargo shuttle to be parallel to a floor panel. The method includes detecting, by a first proximity sensor near a first air blower coupled to the cargo shuttle, a first distance from the cargo shuttle to the floor panel. The method also includes detecting, by a second proximity sensor near a second air blower coupled to the cargo shuttle, a second distance from the cargo shuttle to the floor panel. The method also includes adjusting, using a processor, a first rate of air flow and a second rate of air flow based on the first distance and the second distance. The method also includes blowing, by the first air blower, a first flow of air at the first rate of air flow. The method also includes blowing, by the second air blower, a second flow of air at the second rate of air flow.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option.

As used herein, "aft" refers to the direction associated with the tail of an aircraft, or generally, to the direction of exhaust of the gas turbine. As used herein, "forward" refers to the direction associated with the nose of an aircraft, or generally, to the direction of flight or motion.

Aircraft cargo management systems as disclosed herein allow cargo to be loaded into an aircraft and positioned within the aircraft in a simple, elegant manner. In that regard, aircraft cargo management systems as disclosed herein may reduce part count and associated replacement/wear costs over time.

Figure 1:
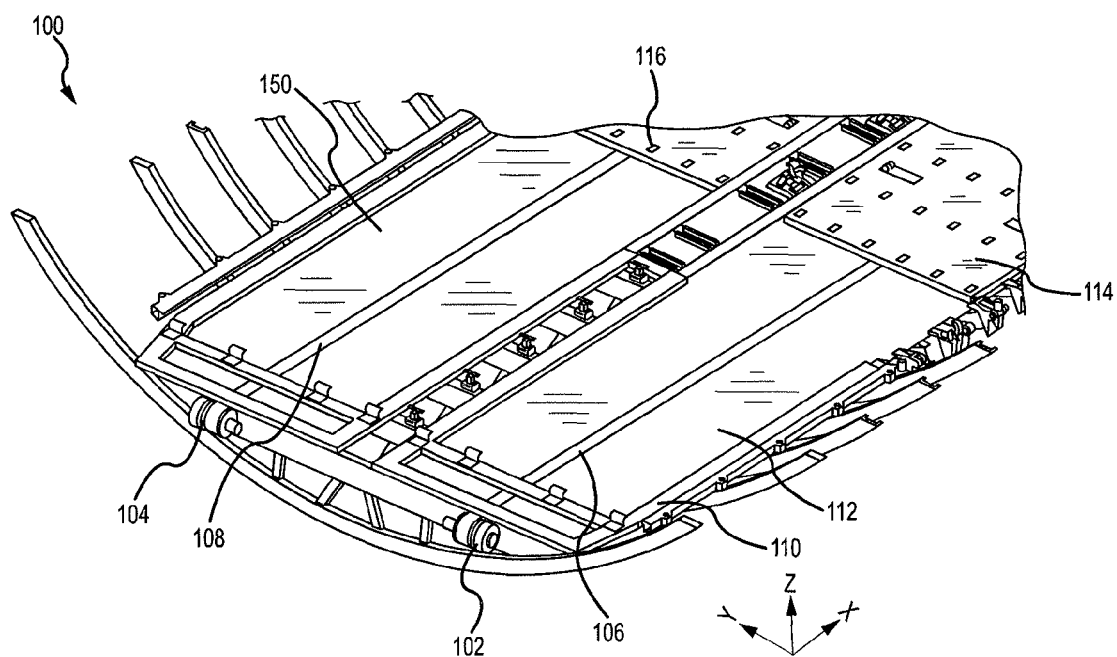
FIG. 1 illustrates a portion of a cargo management system, in accordance with various embodiments.
Figure 2:
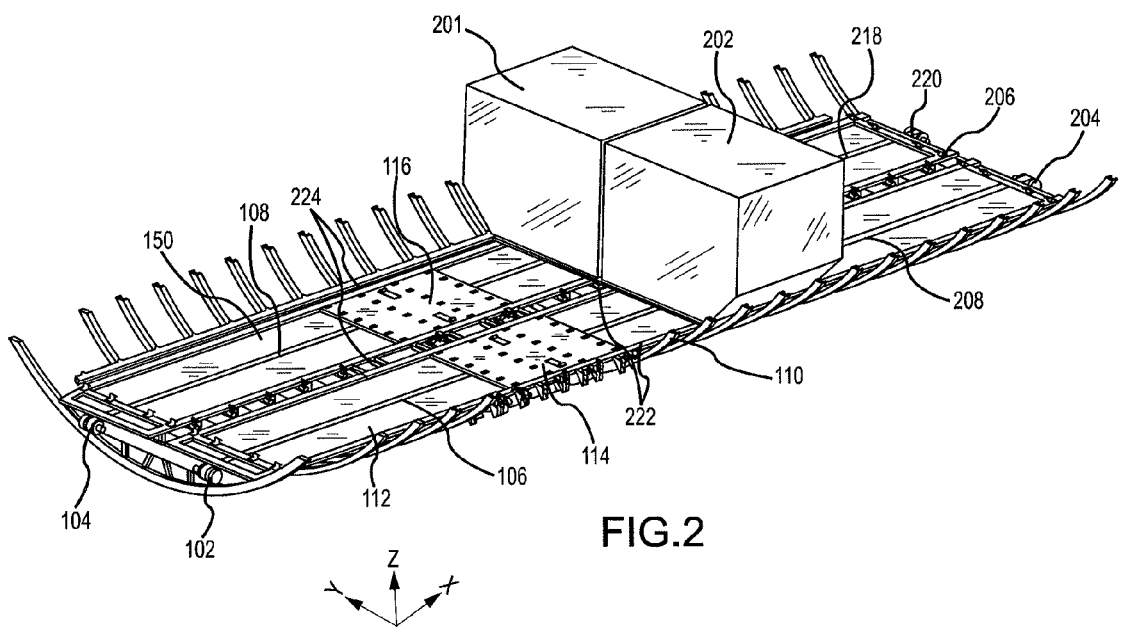
FIG. 2 illustrates a portion of a cargo management system, in accordance with various embodiments.

With reference to FIGS. 1 and 2 aircraft cargo management system 100 is illustrated using an x, y, and z axes for ease of illustration. Air cushion cargo shuttle 114 and 116 are shown forward of an aft portion of an aircraft. Air cushion cargo shuttle 114 and 116 may be quadrangular, having four corners and four sides. Air cushion cargo shuttle 114 is coupled to aft drive shuttle belt 106 and air cushion cargo shuttle 116 is coupled to aft drive shuttle belt 108. Aft drive shuttle belt 106 is coupled to aft shuttle drive unit 102. Aft drive shuttle belt 108 is coupled to aft shuttle drive unit 104. Floor panel 112 is shown beneath air cushion cargo shuttle 114. Floor panel 150 is shown beneath air cushion cargo shuttle 116. As used with respect to air cushion cargo shuttle 114 and 116, the term "beneath" may refer to the negative z direction. Support rails 222 and 224 are shown laterally adjacent to floor panels 112 and 150. Support rails 222 and 224 may be mounted to another aircraft component, such as an airframe, and may be capable of supporting the weight of cargo. Floor panel 112 may comprise at least one of a composite material, a metallic material or a combination of the two.

Air cushion cargo shuttle 114 is coupled to forward drive shuttle belt 208 and air cushion cargo shuttle 116 is coupled to forward drive shuttle belt 218. Forward drive shuttle belt 208 is coupled to forward shuttle drive unit 204. Forward drive shuttle belt 218 is coupled to forward shuttle drive unit 220. Cargo 202 is shown as resting on support rails 222 and cargo 201 is shown as resting on support rails 224. Air cushion cargo shuttle 116 may be used to lift cargo 201 off support rails 224 and move cargo 201 forward or aft.

Forward drive shuttle belt 208, forward drive shuttle belt 218, aft drive shuttle belt 106, and aft drive shuttle belt 108 (collectively, a "shuttle belt") may comprise any suitable belt capable of pulling an air cushion cargo shuttle. For example, a shuttle belt may comprise a flat belt. In that regard, a flat shuttle belt may not occupy excess space along the z direction. For example, a shuttle belt may comprise a polyurethane coated belt that includes a communications and power bus. In that regard, the structural support and power/data functions are provided by a single shuttle belt structure. For example, in various embodiments, a shuttle belt may comprise steel wires oriented in parallel and coated with polyurethane to hold the steel wires together, provide anti-friction properties, and noise dampening properties. Among the steel wires may be copper wires or other wires that are capable of carrying an electrical current at any suitable voltage. In that regard, the shuttle belt may comprise one or more copper wires to carry high voltage power and/or low voltage electrical signals that may convey data.

The shuttle belts may be wound around a portion of forward shuttle drive unit 204, forward shuttle drive unit 220, aft shuttle drive unit 102 and aft shuttle drive unit 104 (collectively, "shuttle drive unit"). In that regard, a shuttle drive unit may comprise a cylindrical structure (e.g., a bobbin) to which a shuttle belt is affixed. The shuttle drive unit comprises a motive device, such as an electric motor, to rotate the bobbin in a desired direction. The shuttle drive unit may also cause the electric motor to allow the bobbin to rotate. For example, the electric motor may provide a negative torque to the gear reduction system so that power may be regenerated and re-supplied to a power bus.

Thus, as forward shuttle drive unit 204 may be rotating its bobbin to pull forward drive shuttle belt 208 forward, aft shuttle drive unit 102 may allow its bobbin to rotate in response to the force exerted by forward drive shuttle belt 208 through air cushion cargo shuttle 114. In like manner, as aft shuttle drive unit 102 may be rotating its bobbin to pull aft drive shuttle belt 106 aft, forward shuttle drive unit 204 may allow its bobbin to rotate in response to the force exerted by aft drive shuttle belt 106 through air cushion cargo shuttle 114.

Accordingly, as forward shuttle drive unit 220 may be rotating its bobbin to pull forward drive shuttle belt 218 forward, aft shuttle drive unit 104 may allow its bobbin to freely rotate in response to the force exerted by forward drive shuttle belt 208 through air cushion cargo shuttle 116. In like manner, as aft shuttle drive unit 104 may be rotating its bobbin to pull aft drive shuttle belt 108 aft, forward shuttle drive unit 220 may allow its bobbin to freely rotate in response to the force exerted by aft drive shuttle belt 108 through air cushion cargo shuttle 116.

Figure 3:
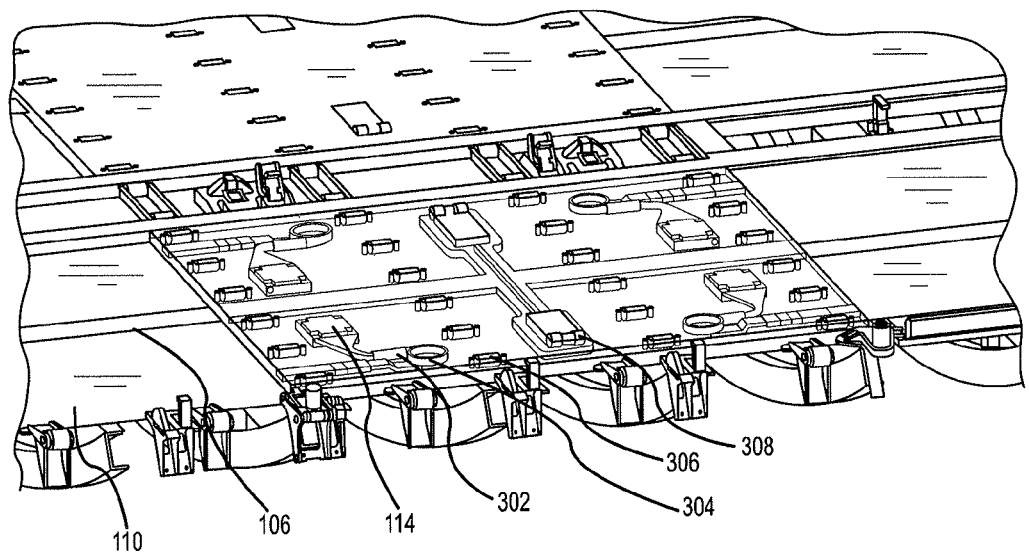
FIG. 3 illustrates a portion of a cargo management system, in accordance with various embodiments.
Figure 4:
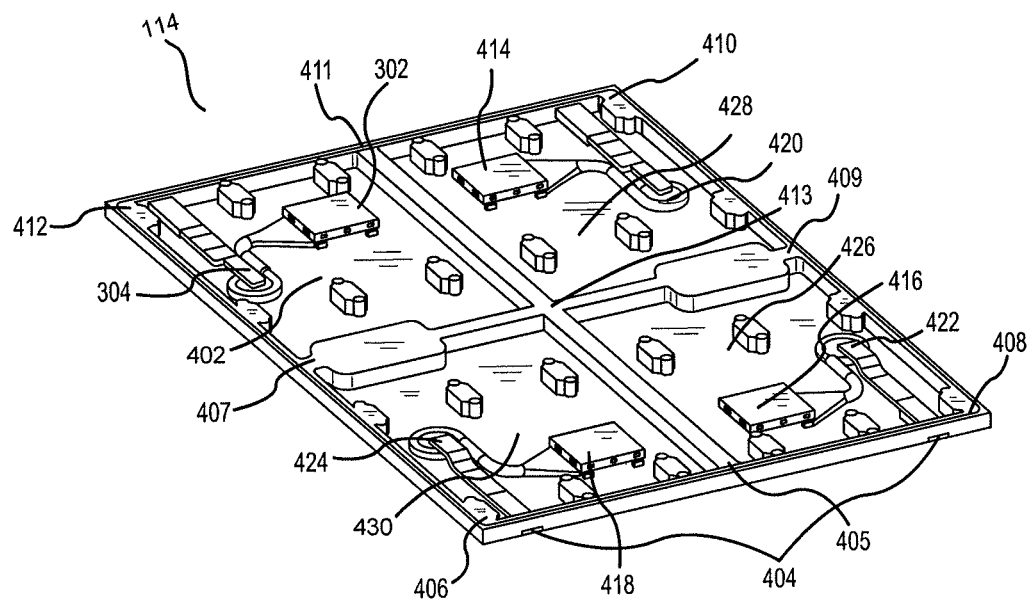
FIG. 4 illustrates the underside of an air cushion cargo shuttle guide assembly, in accordance with various embodiments.

With reference to FIGS. 3 and 4, air cushion cargo shuttle 114 is shown. It should be understood that air cushion cargo shuttle 116 is similarly structured and thus the features discussed herein relative to air cushion cargo shuttle 114 are also applicable to air cushion cargo shuttle 116. Power drive unit 308 and roller 306 are shown in air cushion cargo shuttle 114. Power drive unit 308 may drive cargo such as cargo 202, onto and off air cushion cargo shuttle 114. Roller 306 may facilitate movement of cargo 202 with respect to air cushion cargo shuttle 114.

Centrifugal air blower 304 is shown coupled beneath air cushion cargo shuttle 114. Air cushion cargo shuttle 114 may comprise one or more centrifugal air blowers.

Centrifugal air blower 304 is controlled by centrifugal air blower controller 302. Air cushion cargo shuttle 114 may comprise one or more centrifugal air blower controllers. In various embodiments, each centrifugal air blower has one associated centrifugal air blower controller, though in various embodiments one centrifugal air blower controller controls multiple centrifugal air blowers. Centrifugal air blower controller 302 may provide power and instructions to centrifugal air blower 304 to control how and when centrifugal air blower 304 operates. Centrifugal air blower 304 comprises inlets 404. Inlets 404 allow the centrifugal air blower 304 to receive air from outside volume 402 and deliver that air to volume 402. In various embodiments, each centrifugal air blower has one associated inlet, though in various embodiments one centrifugal air blower is associated with multiple inlets. In further embodiments, a single inlet may supply air to one or more centrifugal air blowers.

Volume 402 of air cushion cargo shuttle 114 is shown in fluid communication with an outlet of centrifugal air blower 304. In that regard, centrifugal air blower 304 may blow air beneath air cushion cargo shuttle 114 and, more specifically, into volume 402. Volume 402 is shown in proximity to floor panel 112 in FIG. 1.

As shown, air cushion cargo shuttle 114 has four centrifugal air blower controllers 302, 414, 416, and 418 driving four centrifugal air blowers 304, 420, 422, and 424 to blow air into four different volumes 402, 426, 428, and 430.

Proximity sensors 406, 407, 408, 409, 410, 411, 412 and 413 may be placed around the bottom of air cushion cargo shuttle 114 at various locations. Proximity sensors 406, 407, 408, 409, 410, 411, 412 and 413 may detect a distance from air cushion cargo shuttle 114 to floor panel 112.

Distance measuring sensors other than proximity sensors may be used for detecting a distance from air cushion cargo shuttle 114 to floor panel 112, such as capacitive sensor, capacitive displacement sensor, Doppler effect sensor, eddy-current sensor, inductive sensor, laser rangefinder sensor, magnetic sensor, passive optical sensor, passive thermal sensor, photocell sensor, radar sensor, sonar sensor and/or ultrasonic sensor.

In various embodiments, greater or fewer proximity sensors than those illustrated may be positioned around air cushion cargo shuttle 14 and proximity sensors may be placed in any position. In preferred embodiments, proximity sensors 406, 408, 410 and 412 are positioned at the corners of air cushion cargo shuttle; proximity sensors 405, 407, 409 and 411 are positioned at a center-point of each edge of the air cushion cargo shuttle 114; and proximity sensor 413 is positioned at the center of air cushion cargo shuttle 114. This positioning of proximity sensors provides distance data that is representative of the entire air cushion cargo shuttle 114. This positioning of proximity sensors also provides sufficient distance data detection in the case of a malfunctioning proximity sensor.

Data from proximity sensors 406, 407, 408, 409, 410, 411, 412 and 413 may be used to detect and compensate for uneven cargo loads. For example, in the event cargo 202 shifts to one portion of air cushion cargo shuttle 114 or otherwise exerts more force on a portion of air cushion cargo shuttle 114 relative to another, data from proximity sensors 406, 407, 408, 409, 410, 411, 412 and 413 may detect that one portion of air cushion cargo shuttle 114 is not as far from floor panel 112 as one or more other portions of air cushion cargo shuttle 114. In that regard, where insufficient distance from floor panel 112 is achieved, a centrifugal air blower controller may command its associated centrifugal air blower to increase output to compensate for the uneven load.

A preferred distance or target range of distances may exist between the proximity sensors and floor panel 112 for different operations of air cushion cargo shuttle 114. For example, if air cushion cargo shuttle 114 is being moved aft or forward while carrying cargo, then the target range of distances may be between an eighth of an inch (3.175 mm) and a quarter of an inch (6.35 mm). However, if air cushion cargo shuttle 114 is being loaded or unloaded, the target range of distances may be 1 mm to 2 mm. If air cushion cargo shuttle 114 is to be parked, the distance may be 0 mm, as air cushion cargo shuttle 114 will be at rest on floor panel 112.

It is also desired that each proximity sensor be nearly the same distance to floor panel 112 as the other proximity sensors. In various embodiments, a tolerance distance exists that is an acceptable distance differential between the proximity sensors. For example, the tolerance distance may be one sixteenth of an inch (1.59 mm), such that it is acceptable if the distance detected by each proximity sensor to floor panel 112 is within one sixteenth of an inch of the distance detected by each of the other proximity sensors.

Figure 5A:
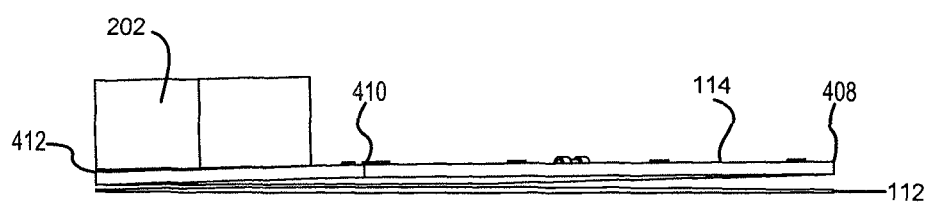
FIG. 5A illustrates uneven cargo positioned on an air cushion cargo shuttle, in accordance with various embodiments.

FIG. 5A illustrates an example of uneven cargo 202 positioned on air cushion cargo shuttle 114. Proximity sensors 412, 410 and 408 are illustrated on air cushion cargo shuttle 114. As illustrated, cargo 202 is exerting more force near proximity sensor 412 than near proximity sensor 410 and 408. This uneven force results in air cushion cargo shuttle 114 being closer to floor panel 112 near proximity sensor 412 than near proximity sensor 410 and proximity sensor 408. The systems and methods described herein aim to provide control to centrifugal air blower 304, 424, 422 and 420 so that air cushion cargo shuttle 114 remains parallel or substantially parallel to floor panel 112.

Figure 5B:
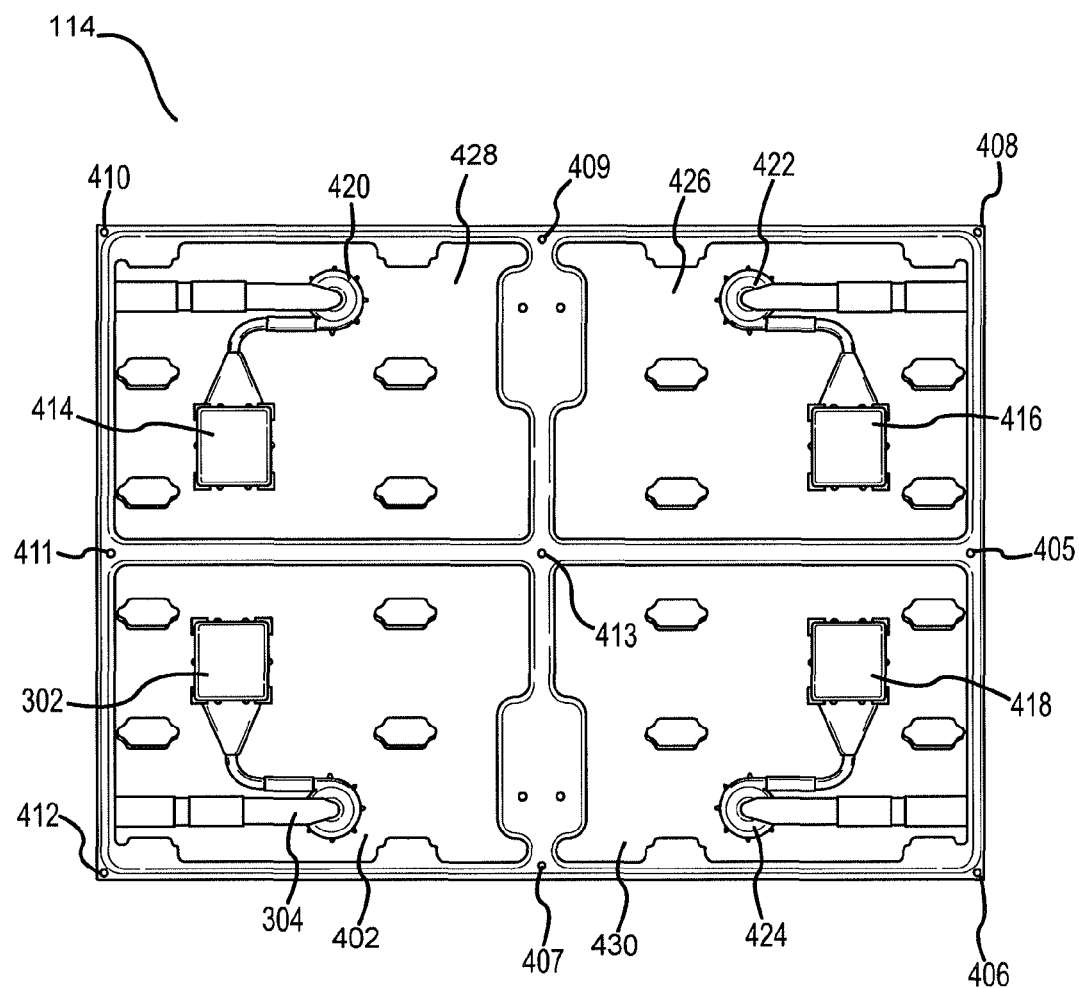
FIG. 5B illustrates the underside of an air cushion cargo shuttle assembly, in accordance with various embodiments.

FIG. 5B illustrates air cushion cargo shuttle 114 from FIG. 5A from the bottom with cargo 202 in the same position on the top of air cushion cargo shuttle 114 as in FIG. 5A. Cargo 202 would then be exerting more force near volume 402 than volumes 428, 426 and 430. This results in volume 426 having the least amount of force exerted by cargo 202. Without control of centrifugal air blower 304, 424, 422 and 420, air cushion cargo shuttle 114 will be closest to floor panel 112 near volume 402 and air cushion cargo shuttle 114 will be farthest from floor panel 112 near volume 426. Volumes 428 and 430 may be within the target range of distances to floor panel 112.

Air cushion cargo shuttle 114 may be able to determine distances to floor panel 112 using proximity sensors. For example, proximity sensor 412 may detect a distance to floor panel 112 that is below the target range of distances. Proximity sensor 408 may detect a distance to floor panel 112 that is above the target range of distances. Proximity sensors 410 and 406 may detect a distance to floor panel 112 that is within the target range. Proximity sensors 411 and 407 may detect a distance to floor panel 112 that is larger than the distance from proximity sensor 412 to floor panel 112. Proximity sensors 409 and 405 may detect a distance to floor panel 112 that is larger than the distance from proximity sensor 412 to floor panel 112. Proximity sensor 413 may detect a distance to floor panel 112 that is within the target range of distances.

Figure 6:
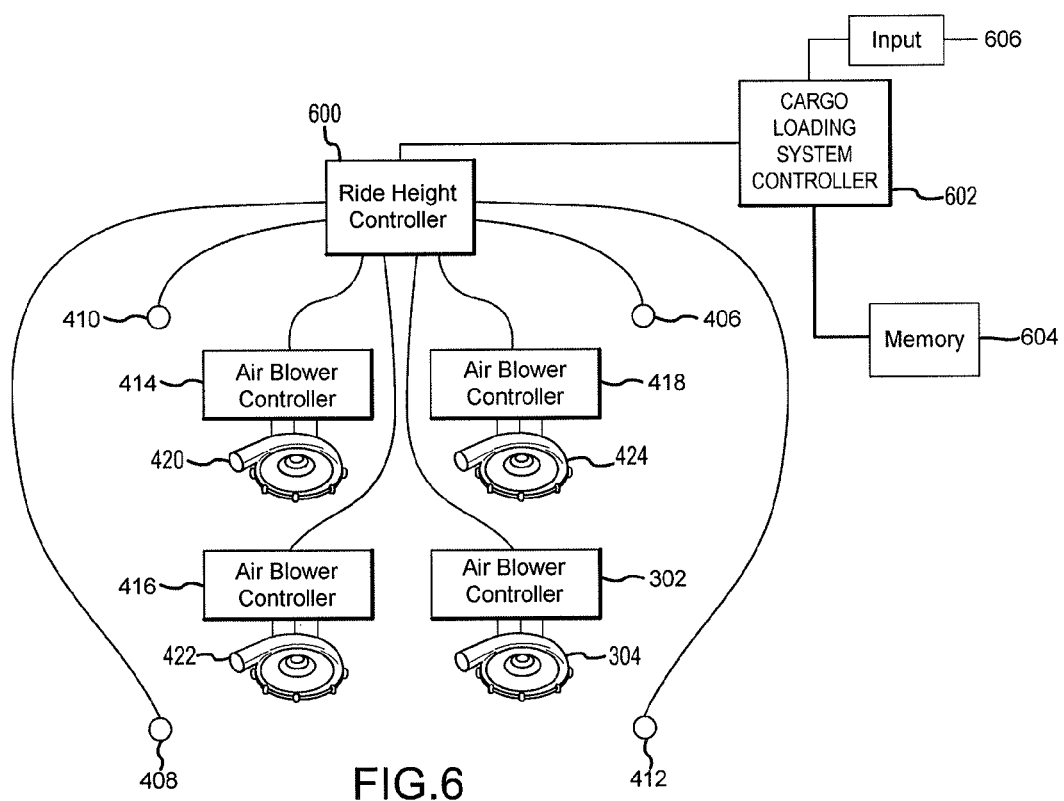
FIG. 6 illustrates a block diagram of an air cushion cargo shuttle, in accordance with various embodiments.

A controller (for example, a PI or PID controller, such as ride height controller 600 illustrated in FIG. 6) may be used to compare distance measurements from proximity sensors to the target range of distances. The controller may be a computer processor such as a RAM processor, DSP processor, distributed processor, or other form of central processing. The target ranges of distances as well as instructions for the controller's operation may be stored in a memory (such as memory 604). The memory may be a RAM or other volatile or non-volatile memory used by the controller. The memory may be a tangible, non-transitory memory or a tangible data storage device, such as a hard disk drive, a solid state disk drive, a hybrid disk drive, or other appropriate data storage, and may further store machine-readable instructions, which may be loaded and executed by the controller.

The controller may also include a zeroing feature. When air cushion cargo shuttle 114 is powered on and resting on floor panel 112 (such that proximity sensors are a zero distance from floor panel 112), the controller may reset any non-zero measurements from proximity sensors to zero measurements. This provides for calibration of height detection.

Returning to the example illustrated in FIGS. 5A and 5B, proximity sensor 412 may detect a distance to floor panel 112 that is less than the target range of distances. As a result, centrifugal air blower controller 302 may instruct centrifugal air blower 304 to increase a rate of flow (volume per second) of air into volume 402. This additional air blown into volume 402 will increase the pressure underneath in volume 402. This will counteract the force exerted by imbalanced cargo 202 over volume 402, and help lift air cushion cargo shuttle 114 so that the distance from each proximity sensor to floor panel 112 is within the target range of distances and within the tolerance distance.

Continuing the example, proximity sensor 408 may detect a distance to floor panel 112 that is greater than the target range of distances. Thus, centrifugal air blower controller 416 may cause centrifugal air blower 422 to decrease its flow of air. This reduces the pressure underneath volume 426 of air cushion cargo shuttle 114. This reduction of pressure will also help to counteract the imbalanced cargo 202 and help to steady air cushion cargo shuttle 114 so that it is parallel of substantially parallel to floor panel 112.

Proximity sensor 410 and 406 may detect a distance to floor panel 112 that is within the target range of distances. Therefore, centrifugal air blower controller 414 and 418 may cause centrifugal air blower 420 and 424 to continue to move air at the same rate.

The increase in air blown by centrifugal air blower 304 and the decrease of air blown by centrifugal air blower 422 may counteract the unbalanced force applied to the top of air cushion cargo shuttle 114 by cargo 202. This counteraction will cause the distance from each proximity sensor to the floor panel 112 to become closer to the target range of distances, and also within the tolerance distance. If, after adjusting the flow of air through centrifugal air blower 304 and 422, distances from each of the proximity sensors are not within the target range of distances, or not within the tolerance distance, then centrifugal air blower controller 302, 414, 416 and 418 may again alter the amount of air blown by centrifugal air blower 304, 420, 422 and 424. Centrifugal air blower controllers may continue to adjust rates of air blown into the respective volumes until air cushion cargo shuttle 114 is parallel or to floor panel 112 and within the target range of distances.

The positioning of proximity sensors provides for sufficient distance detection around air cushion cargo shuttle 114 even if one or more proximity sensors malfunction. For illustrative purposes, an event causes proximity sensor 412 to malfunction. Continuing the example illustrated in FIG. 5A, cargo 202 is still positioned over volume 402. Proximity sensor 411 and 407 would still detect a distance to floor panel 112 that is less than the preferred distance. Proximity sensor 408 would still detect a distance to floor panel 112 that is greater than the preferred distance. In this situation, the controller would determine that data received from a proximity sensor may be incorrect. The controller may implement logic to determine whether a failure of a proximity sensor has occurred, or whether interference of a signal has caused the incorrect data.

The data from proximity sensors 407, 411 and 408 (and other working proximity sensors) is sufficient to determine distance information from air cushion cargo shuttle 114 to floor panel 112 at all points of air cushion cargo shuttle. This illustrates that proximity sensors are sufficient to determine distance information even in the event of a malfunctioning proximity sensor.

Assume now that all proximity sensors except for proximity sensor 412 are detecting a distance that is within the target range of distances above floor panel 112. Assume now proximity sensor 412 detects a distance that is significantly less than the desired distance above floor panel 112. With this information, the controller may determine that the distance detected by proximity sensor 412 is errant. The controller may then disregard any data provided by proximity sensor 412 and rely solely on distance data from the rest of the proximity sensors. The controller may implement logic to determine whether the proximity sensor 412 is malfunctioning or whether noise or other interference caused the errant measurement.

FIG. 6 illustrates a block diagram of air cushion cargo shuttle 114. A cargo loading system controller 602 is attached to memory 604. Memory 604 may instead be connected to ride height controller 600, or ride height controller 600 may be connected to another memory. Memory 604 may be positioned anywhere on the airplane, or may be accessed remotely, such as in a cloud (i.e., a cloud computing system). Cargo loading system controller 602 may be positioned anywhere on or off of the aircraft and may be connected to the memory 604. Cargo loading system controller 602 may be mounted to the aircraft, positioned within a portable device that may be attached to air cushion cargo shuttle 114 or accessed remotely via a wireless or wired connection.

Cargo loading system controller 602 may provide instructions to a ride height controller 600. For example, the instructions may be to pick up cargo 202, put down cargo 202 or park air cushion cargo shuttle 114. Parking air cushion cargo shuttle 114 includes stopping a flow of air through centrifugal air blowers 304, 420, 422 and 424 and allowing air cushion cargo shuttle 114 to make contact with floor panel 112.

An input 606 may be connected to cargo loading system controller 602. Input 606 may be any type of input such as a lever, a crank, a button, a knob, a microphone, a sensor or the like used by an operator or logical input from a computer. A user may provide input to cargo loading system controller based on the desired action of air cushion cargo shuttle 114. The provided input may be keystrokes, voice commands, gestures or the like.

Ride height controller 600 is connected to centrifugal air blower controller 414, 416, 418 and 302. Ride height controller 600 is also connected to all proximity sensors, including proximity sensor 406, 408, 410 and 412. Ride height controller 600 may be positioned anywhere on the aircraft or air cushion cargo shuttle 114.

Ride height controller 600 receives instructions from cargo loading system controller 602. In various embodiments, the instructions include a preferred height of air cushion cargo shuttle 114 or the target range of distances. In various embodiments, ride height controller 600 determines the preferred height (or target range of distances) based on the instructions from ride height controller. Ride height controller 600 then queries proximity sensors to determine an actual distance from each proximity sensor to floor panel 112. Ride height controller 600 then compares distance data from proximity sensors to the target range of distances and the tolerance distance. If the distance detected by a proximity sensor is not within the target range of distances, then ride height controller 600 instructs centrifugal air blower controllers 302, 414, 416 and 418 to change an amount of air flow through centrifugal air blowers 304, 420, 422 and 424. This process may be repeated until the distance detected by each proximity sensor is within the target range of distances, indicating that air cushion cargo shuttle 114 is parallel or substantially parallel to floor panel 112 and is at the preferred distance from floor panel 112.

In various embodiments, ride height controller 600 first determines an average distance to floor panel 112 from proximity sensors. Ride height controller 600 may then compare the average distance to the target range of distances. After determining whether the average distance is near the preferred distance, then ride height controller 600 may determine if all proximity sensors are within the tolerance distance.

In various embodiments, only one controller is provided. For example, one controller may be provided that performs the actions of cargo loading system controller 602, ride height controller 600 and centrifugal air blower controllers 302, 414, 416 and 418. In various embodiments, ride height controller 600 and cargo loading system controller 602 may be combined into a single controller. In various embodiments, ride height controller 600 may be combined with centrifugal air blower controllers 302, 414, 416 and 418.

Figure 7:
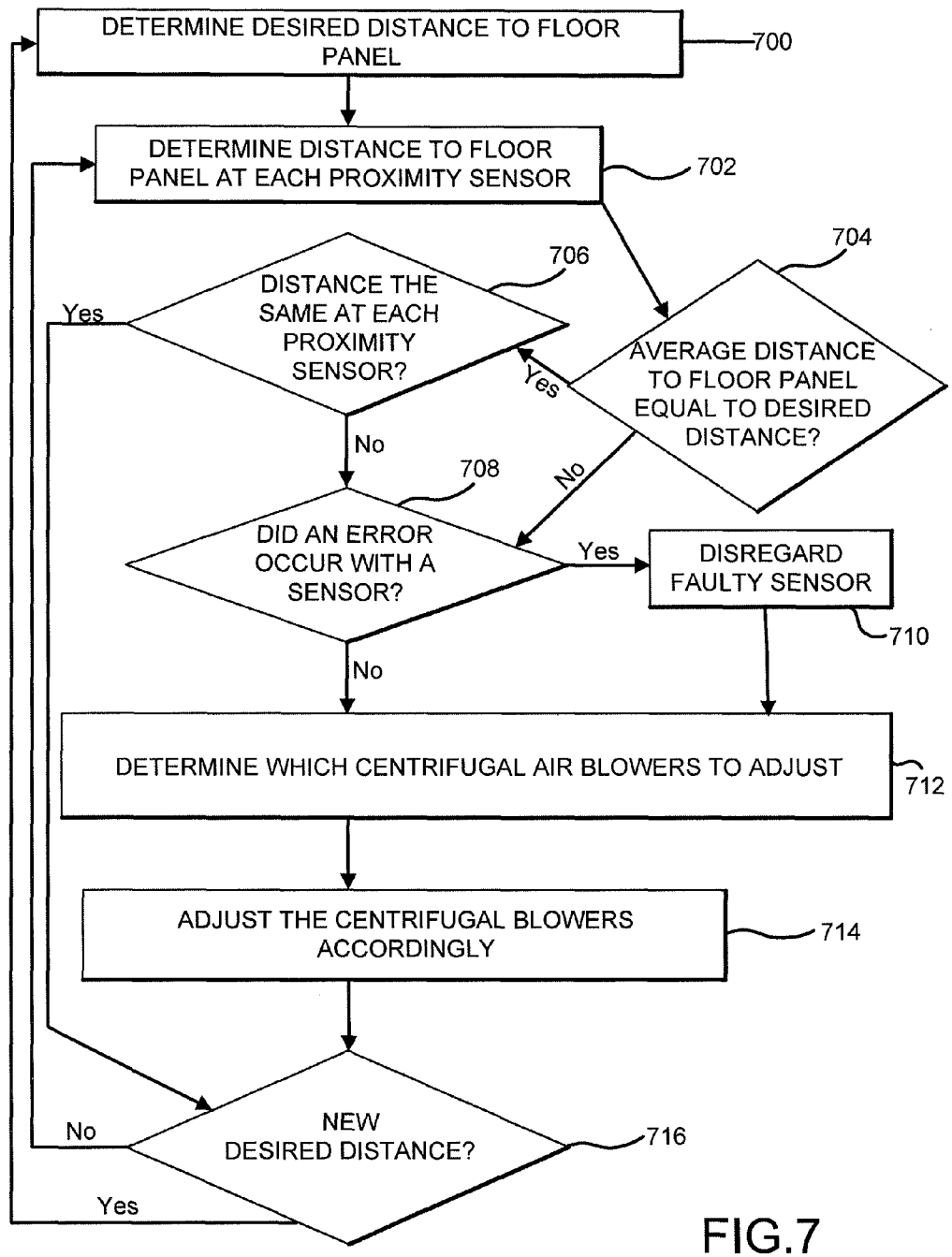
FIG. 7 illustrates a method for controlling a distance between an air cushion cargo shuttle and a floor panel.

FIG. 7 illustrates a method for controlling a distance between air cushion cargo shuttle 114 and floor panel 112. Instructions correlating to the method steps may be stored in memory 604 and may be performed by ride height controller 600 and/or cargo loading system controller 602 and/or centrifugal air blower controllers 302, 414, 416 and 418.

In block 700, the controller may receive or determine a target range of distances between air cushion cargo shuttle 114 and floor panel 112. For example, ride height controller 600 may receive this range in an instruction from cargo loading system controller 602. The instruction may include picking up cargo 202, to setting down cargo 202, or to parking air cushion cargo shuttle 114. An instruction to pick up cargo 202 would result in an increased distance between air cushion cargo shuttle 114 and floor panel 112. An instruction to set down cargo 202 would result in a reduced distance between air cushion cargo shuttle 114 and floor panel 112. An instruction to park air cushion cargo shuttle 114 would result in air cushion cargo shuttle 114 being in direct contact with floor panel 112. In various embodiments, an instruction to set down air cushion cargo shuttle 114 results in air cushion cargo shuttle 114 being in contact with floor panel 112 with some air still flowing through centrifugal air blowers 304, 418, 420 and 422. An instruction to set down cargo may also result in air cushion cargo shuttle 114 being positioned slightly above floor panel 112. In order to properly complete the set down cargo 202 instruction, air cushion cargo shuttle 114 should be at such a distance from floor panel 112 such that the top of air cushion cargo shuttle 114 is beneath support rails 222. This allows cargo 202 to rest on support rails 222 while air cushion cargo shuttle 114 can be moved forward or aft from underneath cargo 202.

In block 702, after a target range of distances to floor panel 112 is determined, the distance to floor panel 112 is determined at each proximity sensor. For example, ride height controller 600 may receive a detected distance from each proximity sensor. Ride height controller 600 may query the proximity sensors, or the proximity sensors may continuously provide detected distances to the ride height controller 600.

In block 704, an average distance from the proximity sensors to floor panel 112 may be determined. This average distance may then be compared to the target range of distances received or determined in block 700. If the average distance to floor panel 112 is within the target range of distances, then the method may proceed to block 706.

In block 706, it is determined whether the distance from each proximity sensor to floor panel 112 is within the tolerance distance. For example, ride height controller 600 may receive a detected distance from each proximity sensor. Ride height controller 600 may then compare each detected distance. If each detected distance is within the tolerance distance, then the process may proceed to block 716. In block 716 it is determined whether new instructions have been received regarding control of the air cushion cargo shuttle 114. If new instructions have not been received, then the process may return to block 702. If new instructions have been received, then the process may return to block 700. In block 706, if it is determined that at least one proximity sensor detected a distance not within the tolerance distance, then the process may proceed to block 708.

In various embodiments, the function of blocks 704 and 706 may be combined. For example, ride height controller 600 may simply compare the detected distance from each proximity sensor to the target range of distances to determine both whether the proximity sensors are within the target range of distances and whether each proximity sensor is within the tolerance distance.

In block 708, it is determined whether an error occurred with a proximity sensor. This may be determined by comparing detected distances from each proximity sensor. For example, if all but one proximity sensor detected one distance (e.g., 5 mm) and one proximity sensor detected another distance (e.g., 20 mm), then the controller may determine that an error occurred. Likewise, an expected value for each proximity sensor can be determined based on detected values from other proximity sensors. For example, if proximity sensor 408 detects a distance of 5 mm, proximity sensor 413 detects a distance of 2 mm, proximity sensor 410 detects a distance of 2 mm and proximity sensor 406 detects a distance of 2 mm, then it would not be consistent for proximity sensor 412 to detect a distance of 7 mm. Detected distances from proximity sensors 409, 405, 407 and 411 may be taken into consideration in determining whether proximity sensor 408 or proximity sensor 412 is not detecting proper distance measurements.

If an error occurred with a proximity sensor, then the faulty proximity sensor is disregarded in block 710. As previously mentioned, the placement of proximity sensors allows for proper control of air cushion cargo shuttle 114 in the case of a malfunctioning proximity sensor.

In block 712, it is determined which centrifugal air blowers to adjust. This determination includes determining an optimal rate of air flow through each centrifugal air blower. An optimal rate of air flow for each centrifugal air blower is the rate of air flow that will cause air cushion cargo shuttle 114 to be at or near the preferred distance above floor panel 112 and that will cause a distance from each proximity sensor to floor panel 112 to be equal or substantially equal (within the tolerance distance). If air cushion cargo shuttle 114 is at a distance less than the target range of distances but all proximity sensors detect an equal distance to floor panel 112, then all centrifugal air blowers will be adjusted in the same manner (increase a flow of air through centrifugal air blowers). However, if detected distances are different for each proximity sensor, then each centrifugal air blower may be adjusted separately in order to cause air cushion cargo shuttle 114 to be parallel or substantially parallel to floor panel 112.

In block 714, centrifugal air blowers 420, 304, 418 and 422 may be adjusted based on the determination made in block 712. For example, ride height controller 600 may instruct centrifugal air blower controllers 302, 414, 416 and 418 to cause centrifugal air blowers 304, 420, 422 and 424 to alter the flow of air.

In block 716, it is determined whether a new instruction has been received indicating a new target range of distances between of air cushion cargo shuttle 114 and floor panel 112. If no new instruction has been received, the process returns to block 702. If a new target range of distances have been received, then the process returns to block 700.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A cargo shuttle comprising:
    a first portion;
    a second portion;
    a first air blower coupled to the cargo shuttle and configured to blow air under the first portion at a first rate;
    a second air blower coupled to the cargo shuttle and configured to blow air under the second portion at a second rate;
    a first proximity sensor coupled to the cargo shuttle and configured to detect a first distance from the first portion to a floor panel;
    a second proximity sensor coupled to the cargo shuttle and configured to detect a second distance from the second portion to the floor panel; and
    a processor configured to adjust the first rate and the second rate based on the first distance and the second distance.

2. The cargo shuttle of claim 1, wherein the processor is further configured to determine an optimal first rate and an optimal second rate based on a target range of distances from the cargo shuttle to the floor panel.

3. The cargo shuttle of claim 1, further comprising:
    a third portion; and
    a third proximity sensor coupled to the cargo shuttle and configured to detect a third distance from the third portion to the floor panel, wherein
    the processor is further configured to determine whether the third proximity sensor has malfunctioned based on the first distance, the second distance and the third distance.

4. The cargo shuttle of claim 3, wherein the processor is configured to disregard the third distance if the third proximity sensor has malfunctioned.

5. The cargo shuttle of claim 1, further comprising a third proximity sensor coupled to the cargo shuttle and a fourth proximity sensor coupled to the cargo shuttle, wherein the cargo shuttle is and the first proximity sensor is positioned near a first corner, the second proximity sensor is positioned near a second corner, the third proximity sensor is positioned near a third corner and the fourth proximity sensor is positioned near a fourth corner.

6. The cargo shuttle of claim 5, further comprising a fifth proximity sensor coupled to the cargo shuttle and positioned in a middle of a first side of the cargo shuttle, a sixth proximity sensor coupled to the cargo shuttle and positioned in a middle of a second side of the cargo shuttle, a seventh proximity sensor coupled to the cargo shuttle and positioned in a middle of a third side of the cargo shuttle, an eighth proximity sensor coupled to the cargo shuttle and positioned in a middle of a fourth side of the cargo shuttle and a ninth proximity sensor coupled to the cargo shuttle and positioned in a center of the cargo shuttle.

7. The cargo shuttle of claim 1, further comprising:
    a third portion;
    a fourth portion;
    a third air blower coupled to the cargo shuttle, positioned under the third portion and configured to blow air under the third portion at a third rate; and
    a fourth air blower coupled to the cargo shuttle, positioned under the fourth portion and configured to blow air under the fourth portion at a fourth rate.

8. The cargo shuttle of claim 1, further comprising
    a first air blower controller coupled to the cargo shuttle and configured to cause the first air blower to blow air at an optimal first rate; and
    a second air blower controller coupled to the cargo shuttle and configured cause the second air blower to blow air at an optimal second rate.

9. The cargo shuttle of claim 1, wherein the processor determines an optimal first rate and an optimal second rate based on a difference between the first distance and the second distance.

10. A method for causing a cargo shuttle to be parallel to a floor panel comprising:
    detecting, by a first proximity sensor near a first air blower coupled to the cargo shuttle, a first distance from the cargo shuttle to the floor panel;
    detecting, by a second proximity sensor near a second air blower coupled to the cargo shuttle, a second distance from the cargo shuttle to the floor panel;
    adjusting, using a processor, a first rate of air flow and a second rate of air flow based on the first distance and the second distance;
    blowing, by the first air blower, a first flow of air at the first rate of air flow; and
    blowing, by the second air blower, a second flow of air at the second rate of air flow.

11. The method of claim 10, wherein adjusting the first rate of air flow and the second rate of air flow is based on a target range of distances from the cargo shuttle to the floor panel.

12. The method of claim 11, further comprising:
    determining, by the processor, the target range of distances based on an instruction to pick up cargo, put down cargo or park the cargo shuttle.

13. The method of claim 10, further comprising:
    detecting, by a third proximity sensor, a third distance from the cargo shuttle to the floor panel; and
    determining, by the processor, whether the third proximity sensor has malfunctioned based on the first distance, the second distance and the third distance.

14. The method of claim 13, further comprising:
    disregarding, by the processor, the third distance if the third proximity sensor has malfunctioned.

15. The method of claim 10, further comprising:
    controlling, by a first air blower controller, a first rate of air flow through the first air blower; and
    controlling, by a second air blower controller, a second rate of air flow through the second air blower.

* * * * *